Feb. 23, 1965  J. M. RIEBE ETAL  3,170,657
LANDING ARRANGEMENT FOR AERIAL VEHICLE
Original Filed May 2, 1960
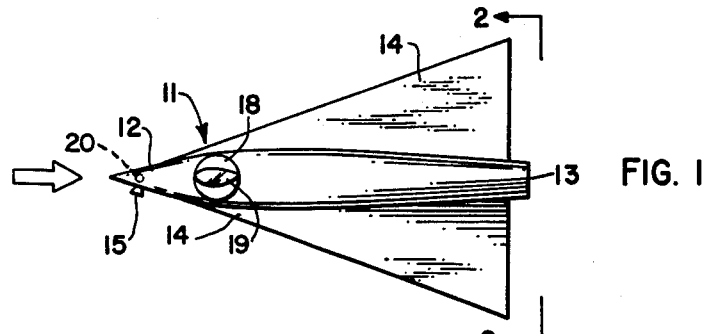
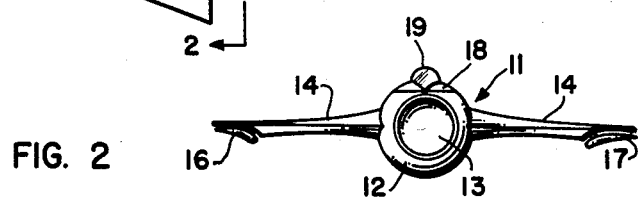
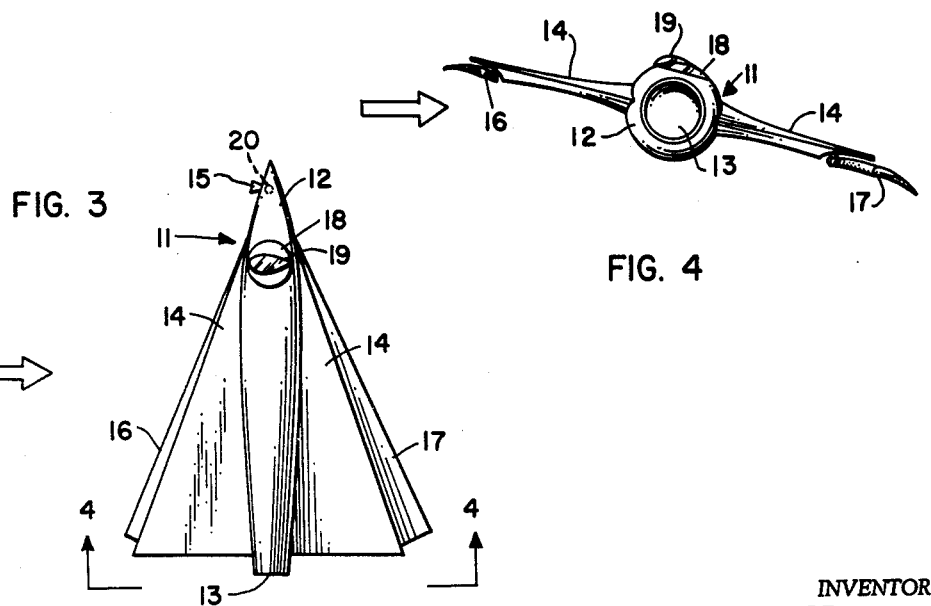
INVENTORS
JOHN M. RIEBE
VERNARD E. LOCKWOOD
BY
ATTORNEYS United States Patent Office 3,170,657
Patented Feb. 23, 1965

3,170,657
LANDING ARRANGEMENT FOR AERIAL VEHICLE
John M. Riebe, Newport News, and Vernard E. Lockwood, Hampton, Va., assignors to the United States of America as represented by the Administrator of the National Aeronautics and Space Administration
Original application May 2, 1960, Ser. No. 26,375, now Patent No. 3,028,122, dated Apr. 3, 1962. Divided and this application Mar. 22, 1962, Ser. No. 181,828
4 Claims. (Cl. 244—46)
(Granted under Title 35, U.S. Code (1952), sec. 266)

The invention described herein may be manufactured and used by or for the Government of the United States of America for governmental purposes without the payment of any royalties thereon or therefor.

This application is a division of our copending application Serial No. 26,375, filed May 2, 1960, to be issued April 3, 1962 as Patent No. 3,028,122.

This invention relates generally to aerial vehicles capable of very high speed flight within the earth's atmosphere and also having low speed flight capabilities for takeoff from and landing upon presently existing airfields.

The speed capabilities of aircraft have rapidly advanced in recent years as a result of increased knowledge and experience in the fields of aerodynamics and propulsion. These aircraft have heretofore been designed to comply with the requirements of high speed aerodynamics, which are generally incompatible with the characteristics of configurations designed for low speed takeoff and landing. Some of the approaches taken in recent years to overcome this apparent design incompatibility have tended to be somewhat evasive of the problem rather than soluble thereof. It is a matter of common knowledge, for example, that most present day upper altitude, very high speed, research aircraft generally descend at a very rapid rate and land at a speed of several hundreds of miles per hour, making it necessary to confine operations of these aircraft to the vicinity of an extremely large, flat, cleared area, such as a dry, salt lake bed, on which the aircraft may touch down and skid to a stop. In the landing of transonic and low supersonic aircraft drogue parachutes have been used with some degree of success in reducing velocity after contact of the aircraft with the ground.

The present invention is the result of a positive approach to resolve the design difficulties hereinbefore noted, and establishes an aerodynamic configuration for an aircraft having a planform variable in flight between a low aspect ratio attitude for high speed flight and a high aspect ratio attitude with high aerodynamic lift and low drag for low speed takeoff or landing of such aircraft. This invention is further directed to the provision of means for increasing the aerodynamic lift of the aircraft when positioned in such high aspect ratio attitude.

Accordingly, it is an object of the present invention to provide an aircraft configuration positionable in a low aspect ratio attitude for high speed flight.

Another object of the instant invention is the provision of an aircraft configuration positionable in a high aspect ratio attitude for low speed flight, takeoff, or landing.

A still further object of the present invention is the provision of a new and improved variable planform configuration for aircraft characteriized by large in flight aspect ratio variation capabilities.

Another still further object of the instant invention is the provision of a new and improved variable planform configuration for aircraft characterized by large in flight aspect ratio variation capabilities, and further characterized by aerodynamic lift capabilities exceeding the increase in lift obtainable by increasing the aspect ratio thereof.

According to the present invention, the foregoing and other objects are attained by providing an aircraft with an elongated fuselage or hull section, jet means for yawing the fuselage section while in flight between a low aspect ratio position substantially in alignment with the direction of movement of the aircraft and a high aspect ratio position substantially transverse to the direction of movement of the aircraft, and also means operable to increase aerodynamic lift generated by the aircraft when the fuselage or hull section thereof is positioned substantially transverse to the direction of movement of the aircraft through the atmosphere.

A more complete appreciation of the invention and many of the attendant advantages thereof will be readily apparent as the same becomes better understood by reference to the following detailed description when considered in connection with the accompanying drawing wherein:

FIG. 1 is a plan view of a high speed aircraft configuration in a low aspect ratio flight attitude;

FIG. 2 is an elevational view of the aircraft of FIG. 1 taken along the line 2—2 of FIG. 1;

FIG. 3 is a plan view of the high speed aircraft configuration of FIG. 1 in a high aspect ratio flight attitude; and, FIG. 4 is an elevational view of the aircraft of FIG. 3 taken along the line 4—4 of FIG. 3.

Referring now more particularly to the drawing, wherein like reference numerals designate identical parts throughout the several views, and more particularly to FIGS. 1 and 2, there is shown a very high speed aircraft, generally designated by the reference numeral 11. Aircraft 11 is provided with a conventional fuselage 12 of the type having a reaction motor mounted therein; the exhaust nozzle 13 of the motor being positioned at the after end of fuselage 12 in longitudinal alignment therewith. Fuselage 12 is provided with stubby highly swept wings 14 extending along the greater part of the length of fuselage 12 with the trailing edges thereof positioned closely adjacent the after end of fuselage 12, and along with fuselage 12 defining an aircraft delta planform. Fuselage 12 is also provided with a yaw control jet device having a nozzle 15 located near the forward end thereof a substantial distance from the center of gravity of aircraft 11. Nozzle 15 is arranged to direct a jet blast transversely with respect to the longitudinal centerline of aircraft 11 in substantially the same horizontal plane occupied by the airplane center of gravity and operable to induce a yawing moment about the aircraft center of gravity to change the heading of the aircraft with respect to the direction of movement thereof. Each of the wings 14 is also provided with a movable flap positioned along the leading or outboard edge thereof; one of these flaps, designated by the reference numeral 16, being smaller in area than the other flap, designated by the reference numeral 17. Each of the flaps 16 and 17 in plan view take the form of long thin wedges; the length thereof being substantially equal, and the maximum breadth of flap 16 being about half the maximum breadth of flap 17. Each flap is normally positioned in a conforming recess provided on the under surface of each wing 14 for high speed flight, with the broadest portion of each flap positioned adjacent the wing trailing edge and the outboard edge of each flap being positioned substantially adjacent the wing leading or outboard edge. The forward end of each flap is pivotally connected to the structure of the corresponding wing 14, and suitable means, not shown, are provided for moving the after end of each flap outwardly and somewhat downwardly from the position shown in FIG. 2 to the position shown in FIGS. 3 and 4. A pilot's compartment 18, surmounted by a suitable canopy 19, is also provided in fuselage 12. Compartment 18 is constructed as a cylindrical unit capable of being rotated through at least a ninety degree angle; the pilot's controls and the like being interconnected by means of flexible, electro-mechanical linkages to the aircraft control surfaces and the like. Aircraft 11 is also provided with suitable landing gear, not shown, comprising, by way of example, tandemly mounted main wheels retractable into fuselage 12 and outrigger wheels retractable into wings 14; each of these wheels being rotatable through a ninety degree angle. Suitable conventional means such as directional jets, control surfaces, or the like, not shown, are also provided in aircraft 11 for assuring adequate roll, yaw, and pitch control thereof when aircraft 11 is positioned in the high aspect ratio attitude as illustrated in FIG. 3. For example, a nozzle 20 is located on the under surface of the nose of aircraft 11 for maintaining roll stability of the aircraft while it is in the attitude illustrated in FIG. 3. If the nose of aircraft 11 rolls down, jet blasts are ejected from nozzle 20 to cause the aircraft to assume a level attitude.

A typical flight mission of aircraft 11 will ordinarily commence with the aircraft positioned for takeoff with the pilot's compartment facing toward the nose of fuselage 12, flaps 16 and 17 in their retracted position, and the landing gear wheels disposed to permit aircraft 11 to move in the direction toward which the nose of fuselage 12 is pointed. Since the wings 14 in this attitude will generate very little aerodynamic lift, it is generally necessary to provide increased thrust during takeoff of aircraft 11 to prevent an excessively long takeoff run, which may be accomplished by providing the reaction motor propulsion means mounted in fuselage 12 with conventional afterburner means which may be utilized until the craft is airborne, and also by providing aircraft 11 with auxiliary solid fuel rocket motors or JATO units, not shown, which may be externally connected to the aircraft 11 and ignited during the takeoff run to increase thrust, and then jettisoned when aircraft 11 is airborne. Thereafter, in normal flight, aircraft 11 is held in this attitude with the nose of fuselage 12 directed into the relative wind, as indicated by the arrow in FIG. 1. Upon the completion of the normal flight mission, aircraft 11 is headed toward its landing area and at a preselected altitude and distance from the landing area, the pilot shuts off the motor in fuselage 12 and then operates the yaw control jet at nozzle 15 to swing fuselage 12 to a position athwart the relative wind, as indicated by the direction of the arrow of FIGS. 3 and 4. Simultaneously with this yawing of aircraft 11, the pilot may also rotate the pilot's compartment 18 in the direction opposite the direction of yaw in order that he may continuously face toward the direction of travel of the aircraft, and the landing gear wheels may also be rotated and lined up in accordance therewith. The pilot then may extend the flaps 16 and 17 to the position shown in FIGS. 3 and 4, with flap 16 upstream and flap 17 downstream with respect to the relative wind. In this attitude, the high aspect ratio of the yawed fuselage and the extended position of the flaps generates very high aerodynamic lift, and aircraft 11 is capable of glide landing at fairly low speed, obviating the necessity of providing a large landing area.

It is also contemplated that aircraft 11 be positioned for takeoff in the high aspect ratio attitude hereinbefore described in which landing of aircraft 11 is accomplished. In order to utilize the reaction motor mounted within fuselage 12 for takeoff in this attitude, a slot, not shown, is provided in a wing 14 adjacent the flap 17, and suitable means are also provided for selectively diverting the exhaust gases discharged by this reaction motor from exhaust nozzle 13 to this slot. The slot is positioned to direct the flow of exhaust gases therefrom over the upper surface of flap 17, when extended, in a rearwardly and somewhat downwardly direction. In this attitude, aircraft 11 may take off after a fairly short run without the assistance of auxiliary thrust generating means. A second nozzle 15, not shown, is also provided for the jet yaw control device. The second nozzle 15 is mounted to provide thrust in the direction opposite to that provided by the first nozzle 15, and is selectively operable to yaw aircraft 11 from its high aspect ratio takeoff attitude to the hereinbefore described normal low aspect ratio, high speed flight attitude.

It will be apparent that the jet yaw control devices herein illustrated and described have been disclosed only by way of illustration, and not limitation, and that the invention contemplates the utilization of other suitable devices similarly operable and deemed well known in the art.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An aircraft comprising: an elongated fuselage section, an aerodynamic lifting surface integral with said fuselage section, propulsion means carried by said fuselage section, means for yawing said fuselage section while in flight between a low aspect ratio position wherein said fuselage section is substantially in alignment with the direction of movement of said aircraft and a high aspect ratio position wherein said fuselage section is substantially perpendicular to said direction of movement, and retractable flap means carried by said aircraft operable for augmenting aerodynamic lift when said fuselage section is positioned substantially transverse to said direction of movement.

2. An aircraft comprising: an elongated fuselage section, reaction propulsion means installed within said fuselage section, a highly swept wing connected to each side of said fuselage section and defining, in combination with said fuselage section, a delta aircraft planform, means for yawing said aircraft while in flight between a low aspect ratio position wherein said fuselage section is substantially aligned with the direction of movement of said aircraft and a high aspect ratio position wherein said fuselage section is positioned substantialy transverse to said direction of movement, and means operable for augmenting aerodynamic lift when said fuselage section is positioned substantially transverse to said direction of movement.

3. The aircraft as defined in claim 2, wherein said lift augmenting means comprise a flap retractably positioned adjacent the leading edge of each of said wings, each of said flaps having an inboard end pivotally connected to one of said wings and an outboard end swingable about said inboard end connection between a position rearwardly of the wing leading edge and a position in which the greater portion of the flap plan area projects forwardly from said leading edge.

4. The aircraft as defined in claim 3, wherein the plan area of one of said flaps extendable forwardly of a wing leading edge is greater than the forwardly extendable plan area of the other of said flaps.

References Cited by the Examiner

UNITED STATES PATENTS

| | | | |
|---|---|---|---|
| 1,844,186 | 2/32 | Short | 244—103 |
| 2,340,237 | 1/44 | Upson | 244—103 |
| 2,743,887 | 5/56 | Fiedler | 244—43 |
| 3,005,603 | 10/61 | Gaskins | 244—6 |

FERGUS S. MIDDLETON, *Primary Examiner.*

MILTON BUCHLER, *Examiner.*